United States Patent [19]
Des Champs

[11] Patent Number: 5,179,998
[45] Date of Patent: Jan. 19, 1993

[54] HEAT RECOVERY VENTILATING DEHUMIDIFIER

[76] Inventor: Nicholas H. Des Champs, P.O. Box 3049, Fincastle, Va. 24090

[21] Appl. No.: 825,266

[22] Filed: Jan. 24, 1992

[51] Int. Cl.$^5$ .................. F25D 17/06; F25B 29/00
[52] U.S. Cl. ......................... 165/1; 165/16; 165/54; 165/66; 62/90; 62/93; 62/95; 62/173
[58] Field of Search ............. 62/90, 93, 95, 173; 165/16, 54, 66, 909

[56] References Cited

U.S. PATENT DOCUMENTS

| | | | |
|---|---|---|---|
| 1,965,078 | 7/1934 | Hewitt et al. | 62/90 |
| 2,237,332 | 4/1941 | Bretzlaff et al. | |
| 2,522,484 | 9/1950 | Ringquist et al. | 62/90 |
| 2,686,406 | 8/1954 | Pessoa | 62/90 |
| 2,783,616 | 3/1957 | Dodge | 62/90 |
| 2,783,623 | 3/1957 | Dodge | 62/90 |
| 3,009,684 | 11/1961 | Munters | 62/90 |
| 3,991,819 | 11/1976 | Clark . | |
| 4,428,205 | 1/1984 | Doderer . | |
| 4,484,451 | 11/1984 | Darm | 62/90 |

FOREIGN PATENT DOCUMENTS

| | | | |
|---|---|---|---|
| 2509038 | 9/1976 | Fed. Rep. of Germany | 165/54 |
| 0627641 | 8/1978 | U.S.S.R. | 165/54 |
| 0994866 | 2/1983 | U.S.S.R. | 165/54 |

OTHER PUBLICATIONS

Ollivieri, Humidity Control, Engineering Systems, May 1991 pp. 37-40.

Nicholas H. Des Champs, Dehumidification of Pool Enclosures-, Jan. '90.
Des Champs Laboratories, Inc., Mini-Z-Pack 87, Sep. 1988.
Nicholas H. Des Champs, Improving Air Quality-, Oct. 1989.
Bob Biase, A New Idea for Dehumidification, Hot Line, Feb. 91.

*Primary Examiner*—John K. Ford
*Attorney, Agent, or Firm*—Donavon L. Favre

[57] ABSTRACT

A heat recovery ventilating dehumidifier provides fresh, cool, low relative humidity air to a building or room during warm weather, and warm fresh air during cold weather. Fresh air is drawn into the heat recovery ventilating dehumidifier, cooled and dehumidified by heat exchange by exhausting stale air in a first heat exchanger, then further cooled and dehumidified by passage through a refrigerant coil. After passage through the refrigerant coil the fresh cool air passes through a second heat exchanger, cooling exhausting stale air and in exchange becoming less cool to reduce the relative humidity. The cool, fresh air having a lowered relative humidity is then used to ventilate a building or room. The cooled exhausting stale air then passes through the first heat exchanger cooling the fresh warm incoming air. In the winter time the refrigerant coil is replaced by a heater and heat is recovered from the exhausting stale air and transferred to the incoming fresh air.

19 Claims, 3 Drawing Sheets

HEAT RECOVERY VENTILATING DEHUMIDIFIER

A heat recovery ventilating dehumidifier is used to provide fresh temperature and humidity controlled air to a room or building.

An early solution to the problem of humid, stagnant, smoke filled air is found in U.S. Pat. No. 2,237,332 of Bretzlaff et al. Bretzlaff et al disclose blowing fresh air through a heat exchanger to cool the air, further chilling the fresh air to reduce the humidity, then passing the chilled air in heat exchange relationship with the incoming fresh air to reduce the relative humidity of the chilled air prior to the entry of the air into a room. While effective to provide fresh air and to reduce humidity, in the example given the room temperature dropped from 103° F. to 92° F., still an uncomfortably high temperature.

U.S. Pat. No. 4,428,205 of Doderer discloses a similar system to that of Bretzlaff et al except that indoor air rather than fresh air is fed through the heat exchanger, chiller unit.

U.S. Pat. No. 3,991,819 of Clark recognizes the problems involved in attempting to ventilate with an air conditioning unit, and provides a separate heat pump ventilator in addition to the air conditioning unit.

The advertisement "Dehumidification of Pool Enclosures—New Fresh Air Systems versus Refrigerated Dehumidification" by Nicholas H. Des Champs, dated Jan. 23, 1990 discloses a system in which fresh air is mixed with outside air to maintain a negative pressure in the pool enclosure. Otherwise there could be condensation, buckling, mold growth and other problems in the walls. The pool enclosure dehumidification system utilizes energy exchange between exhaust air and fresh incoming air to reduce energy costs.

The heat exchanger used is a Des Champs Z-DUCT plate type air-to-air heat exchanger. Its purpose is to transfer the thermal energy in the exhaust airstream to the incoming fresh airstream during cool weather, and reverse the process during warm weather. Counterflow airstream are brought into close proximity, separated by one continuous, dimpled and folded, sheet of aluminum which acts as a primary heat transfer surface. This heat transfer surface is configured to form a matrix with two completely separate and distinct air passages, eliminating cross-contamination. This transfer of energy from exhaust to intake air results in a substantial energy savings Z-DUCT heat exchangers are highly efficient and have an effectiveness of 65 to 85%.

Z-DUCT heat exchangers have been used in MINI-Z-PACK 87 make up air units to provide fresh air while reducing or eliminating the cost of heating or cooling the fresh air as described in Bulletin NO: MZP87-9. Heating and/or cooling coils are optional equipment to heat or cool the fresh air before the air enters the room or building.

Heat recovery ventilating units can be used independently or positioned in series with an air-conditioner. Bulletin FAI 0689 shows a heat recovery ventilator between the fresh outdoor air and an air-conditioner. Bulletin FAI 0689 also discloses closing the outside air damper when using the Des Champs heat recovery ventilating unit.

With emphasis on more outdoor air in heating, ventilating, and air-conditioning (HVAC) system design, engineers and building owners are discovering that conventional HVAC equipment may not satisfy both comfort and code mandated requirements. The demand for 300 to 400 percent more outdoor air during occupied periods places a strain on HVAC equipment, for both the heating and cooling seasons. The fresh air requirement for smoking areas was increased by 70% by ASHRAE STANDARD 62-1989.

In addition ASHRAE STANDARD 62-1989 points out the high humidities can support the growth of pathogenic or allergenic organisms. Examples include certain type of fungi, associated mycotoxins, and dust mites. If the relative humidity in low velocity ducts and plenums exceeds 70%, fungal contamination (for example, mold, mildew, etc.) can occur. Reference is hereby made to pages 6 and 7 of the standard. A proposed solution is found in Humidity Control by Joseph B. Olivieri, P.E,, Ph.D., Engineering Editor of the publication Engineered Systems, page 39 (May 1991).

Olivieri's system uses a sensible cooling coil. Conventional reheat means are used such as burning fuel or using an electrical resistance heater. The use of condenser heat cruds up the system or requires an intermediate heat exchanger.

There are three major HVAC design problems that occur with increased volumes of outdoor air:
1. Maintaining the minimum design outdoor air volume during all weather and all operating conditions.
2. Containing energy costs when operating at the specified outdoor air volume.
3. Increased latent cooling load resulting from bringing in outdoor air which could cause the humidity in the conditioned space to become unacceptably high.

To be more specific the improved heat recovery ventilating dehumidifier for a building or room includes a first heat exchanger to temper incoming fresh air. A duct is connected between the first heat exchanger and an outside air inlet located outside the building for the entry of fresh air into the first heat exchanger. The dehumidifier contains a means to refrigerate a surface. The refrigerated surface is connected to the first heat exchanger by a passageway to provide a means to cool the tempered fresh air and dehumidify the tempered fresh air from the first heat exchanger during warm or humid weather. A second heat exchanger is connected to a return duct from the building or room. A passageway for the cool dehumidified air leads from the refrigerated surface to the second heat exchanger. The second heat exchanger provides a means to temper the fresh dehumidified air by heat exchange with return air supplied to the second heat exchanger from a return air duct to the second heat exchanger from the building or room. A fresh air duct from the second heat exchanger to the interior of the building or room to allows the tempered dehumidified fresh air to enter the building or room. A return passage from the second heat exchanger to the first heat exchanger without thermal conditioning means therein for return air brings the return air to the first heat exchanger. A passage through the first heat exchanger for the return air to pass in heat exchange relationship with the entering fresh air tempers the entering fresh air. An exhaust duct from the first heat exchanger to an outlet located outside of the building provides for a discharge the return air to the atmosphere outside of the room or building.

To be more specific, the method of providing fresh, cool, dehumidified air to an air conditioned building or room comprises drawing fresh air into a first heat exchanger through a duct connected between the first heat exchanger and an air inlet located outside of the building. The fresh air is cooled in the heat exchanger by heat exchange with a return air stream, then further cooled by a refrigeration source which also dehumidifies the cool, fresh air. Then the cool, fresh, dehumidified air is passed through a second heat exchanger in heat exchange relationship with return air from the building or room to reduce the relative humidity of the cool, fresh dehumidified air. Then the fresh air having reduced relative humidity is introduced into the building or room. Return air is drawn through a return duct to the second heat exchanger from the building or room, thus warming the fresh air and cooling the return air. The return air passes from the second heat exchanger to the first heat exchanger without thermal conditioning thereof and then through the first heat exchanger to rewarm the return air and to cool the incoming fresh air. The return air is then discharged through a duct from the first heat exchanger to the atmosphere outside of the building or room.

The following values are a result of using the estimated maximum persons per 1000 square feet of occupied space (as given in ASHRAE 62-1989) in combination with the required CFMOAPP. For instance, a 50,000 square foot office building requires 7,500 (cubic feet per minute) CFM of outside air. A 100 square foot classroom requires 525 CFM.

Taking into consideration the CFM required to heat and cool a given space in a typical Mid-America location, the outdoor air as a percent of the total supply air can be determined. The percent ranks from 28 percent for offices to 80 percent or more for correctional facilities. Classrooms require more than 50 percent outside air with the new ASHRAE standard. Indoor pool enclosures require approximately 35 percent outdoor air for occupant's health and comfort.

It is very common for buildings to have unitary heating and cooling air conditioning equipment usually on the roof, and usually in the 5 to 15 ton category. All of these units have served a particular portion of a building. All of these units have been controlled by a thermostat that has a heating mode, a cooling mode or an automatic mode. Also there is one additional setting, it allows fan on or fan auto. It is usually positioned in fan auto which means that the fan is only on when the thermostat is calling for heating or cooling. The thermostat is positioned in fan auto for heating or cooling. The thermostat is positioned in fan auto because when it is positioned in fan on, the employees complain that it is drafty in the winter or too humid in the summer. The reason for this is that the units are designed to bring in about 10 percent outdoor air (ASHRAE 62-1981). With the fan operating in the summer and no call for cooling, the space becomes humid because of the latent load carried in with the outside air. With the new requirements for more outside air the problems with continually operating the supply fan are exacerbated.

So, with the air conditioning units set for fan auto the units do not operate when the sun is shining and the outdoor temperature is 45 to 65 degrees. They also do not operate most of the year. Therefore, with many constant volume on/off systems, people occupying the space are without the required amount of fresh air. It is conceivable that a well constructed and tightly sealed office building could go for an entire week without any fresh air being introduced to the building through the HVAC system. The engineer may design the system to deliver the code mandated outdoor air, but with a constant volume on/off capability it is doubtful that anywhere near the design air flow is delivered to the space.

With variable volume systems the problem of supplying the correct amount of design outside air is just as elusive. When a building zone requires the design amount of heat, the full amount of design air is delivered to that zone, carrying with it a percentage of outside air which presumably meets the code requirements for fresh air. But, there are plenty of days when parts of the building do not require any heat or cooling, so the variable air volume control boxes close down to their minimum position. If full volume delivered 10 percent outside air, what amount of outside air is delivered when the air volume delivered to the space is only 20 percent of maximum flow? You are correct. This is equivalent to only 2 percent outside air. Not a very healthy situation and one that almost surely will eventually lead to personnel complaints.

There are other problems with maintaining correct design flow of outdoor air. Damper settings are a major cause of reduced fresh-air flow. This could be a result of incorrect outdoor damper setting. The outdoor-air damper could even be disconnected from the damper actuator and wired closed, as has been found to be the case far too often.

Another problem arises, not because a low amount of outside air was brought into the buildings, but because once in, the air was allowed to short circuit to the return ducts before being distributed to occupied areas. An example might be having a supply diffuser and a return grate within an area of a corridor where no one ever congregated. Another case might be where the supply air is kept from the occupied space by office dividers that stratify the supply air.

Maintaining the correct outside air flow to the space has been a big problem in the past, Now, the outside air flow to the space has been increased dramatically. Building occupants are also more attuned to problems associated with a lack of proper ventilation. Occupants are saying, "You sealed up the building, now give us adequate fresh air to breathe or you are going to hear about it".

An example of the problem facing architects and engineers regarding fresh air is happening right now in Lexington, Va. The county decided to consolidate three older high schools into one large new regional high school. The older schools had windows that opened. The new school as designed did not have operable windows. The county board and the architectural firm were put under extreme pressure to change to operable windows. Petitions were circulated to have the county make this change. The architect argued that operable windows will cause the HVAC system to not operate properly. The residents claim that the reason they want operable windows is because they have heard and read about many instances where the HVAC systems do not operate properly anyway and that is why they want operable windows. A "Catch 22" situation.

The situation is further complicated by humidity problems associated with outdoor air. Summer cooling systems are designed to maintain a space temperature of 70° to 75° F. (21° to 24° C.). When cooling is required, space air is caused to traverse a cooling coil which lowers the supply air temperature. Depending upon the control system in use, the supply air may be intermittently cooled to a temperature of 45° to 55° F. (7° to 13° C.) or it could be cooled to some temperature with a variable temperature cooling coil.

With little or no outdoor air being delivered to the conditioned space, a conventional HVAC system can do a reasonable job of maintaining a satisfactory relative humidity while controlling temperature. In buildings where the percentage of outdoor air is high there is a good chance that the relative humidity in the space will also be high, sometimes dangerously high. There are several situations that lead to high space humidity during the cooling season:

1. Make-up air units that deliver supply air at 65° to 75° F. (18° to 24° C.) while removing little or no moisture from the delivered air.
   Example: Motels and hotels are notorious for having essentially unconditioned air delivered to the hallways. The unconditioned air then enters the individual rooms and exits through the toilet exhaust. The moisture brought with the air causes the humidity within the rooms to always be uncomfortably high.
2. Occupied, air-conditioned spaces that are under negative pressure, causing unconditioned outside air to be induced, bringing moisture with it.
   Example: Laboratory class rooms with fan-coil cooling. Lab-hoods exhausting air cause humid air to enter the space and overwhelm the fan-coil units.
3. Air-conditioning units that bring a fixed percentage of outdoor air in even when the cooling coil is not cooling.
   Example: Conventional unitary rooftop air-conditioners that have a "fan-on" setting. The system induces fresh air all the time the fan is operating. However, when the space temperature is satisfied the compressor is off and no moisture is removed from the delivered outside air.
4. When the latent load within the space is high relative to the sensible load plus the application has a code requirement for outdoor air.
   Example: Natatoriums, spas, health clubs, locker rooms, auditoriums, etc.

The HVAC engineer had enough headaches designing systems and maintaining outdoor air flow with the 1981 standards. The problems are multiplied many times when attempts are made to use conventional HVAC equipment to meet the 1989 standards. Let's take on a new strategy. Don't introduce any outside air through the principal HVAC system. That's right, use the HVAC system to heat and cool the building only. Design the system with no outside air openings, or, close and seal the outside air dampers if they are standard equipment.

Now that the occupants are gasping for breath, switch on a make-up air dehumidifier as shown schematically in FIG. 1. One that supplies a fixed amount of fresh, cool, dehumidified, outside air all of the time the building is occupied. No matter what the heating and cooling demands might be, the heat recovery ventilating dehumidifier is designed to deliver to the occupants the code required amount of fresh air. The heat recovery ventilating dehumidifier of the present invention precools the outside with the first pass through the air to air heat exchanger, then the air dehumidifies as it goes through the refrigeration coil, and then the air reheats as it traverses the other side of the air-to-air heat exchanger. On a design (95° F. dry bulb/78° F. wet bulb) summer day, the air entering the space is at a 55% relative humidity and 76° F. The system protects the designers, the equipment suppliers, and the building owners from sick buildings and the wrath of disgruntled occupants with their myriad of legal remedies.

The heat recovery ventilating dehumidifier of the present invention has a duct for the entry of fresh air. A heat exchanger cools the incoming fresh air during warm weather. The cool, fresh air is then further cooled and dehumidified by contact with a refrigerated surface. The cool, dehumidified fresh air then passes through the heat exchanger in heat exchange relationship with the incoming fresh air to reduce the relative humidity of the fresh, cool, dehumidified air. The fresh, cool air having a reduced relative humidity is then introduced into the building. During cold weather, the heat exchanger is bypassed and fresh air is feed through a heater directly into the building.

This system has the following advantages:
1. No outdoor air is supplied during non-occupied periods, thus no energy wasted to temper outdoor air when it is not required.
2. Guaranteed correct volume of outdoor air during occupied periods.
3. Large selection of standard HVAC equipment available even with requirement for high percentage of outdoor air.
4. Economical installation.
5. Simple control.
6. Lower energy consumption resulting from energy recycling.
7. Mitigate stratification problems in cold climates where the mixing of outdoor air and return air is difficult during the colder winter periods.
8. Meet the new fresh air ventilation requirements in existing buildings without having to install and pipe preheat coils including maintaining a relative humidity of less than 70% in the air conditioning ducts to suppress the growth of pathogenic or allergenic organisms.

The present invention is designed primarily as a climate control apparatus for a building or room. The heat recovery ventilating dehumidifier has a duct for the entry of fresh air only through the heat recovery ventilating dehumidifier into the building or room, no stale air is recycled through the heat recovery ventilating dehumidifier.

The heat recovery ventilating dehumidifier has a duct for the entry of fresh air. A first heat exchanger is attached to the duct to temper the fresh air. A refrigerated surface to cool the fresh air and dehumidify the fresh air during warm or humid weather, a second heat exchanger to temper the fresh air by heat exchange with return air from the building or room, a passage through the first heat exchanger for the return air to pass in heat exchange relationship with the entering fresh air to temper the entering fresh air, and an exhaust duct to discharge the return air to the atmosphere outside of the room or building.

Preferably the heat exchangers are air-to-air heat exchanger, such as the Des Champs Z-DUCT heat exchangers described above, as this type of heat exchanger is both economical and efficient.

Preferably the apparatus is used in a building or room occupied by people at least part of the time to provide fresh humidity controlled air to the occupants.

In order to provide proper humidity control at minimum cost, it is preferred that the ventilation and humidity be controlled by the ventilating dehumidifier and the fresh air inlet duct in an air-conditioning system not be used simultaneously with the ventilating dehumidifier.

The ventilating dehumidifier is capable of operation without the addition of elements which would significantly alter its function. Other elements which would not alter the function of the ventilating dehumidifier would be allowing some fresh air into the air-conditioner while the ventilating dehumidifier is turned off. The ventilating dehumidifier is capable of operation without the addition of elements which would alter its function. An unaltered ventilating dehumidifier has the advantages of simplicity, economy, and reliability.

One method of the present invention provides fresh, cool, dehumidified air to an air conditioned building or room. The one method comprises drawing fresh air into a first heat exchanger, cooling the fresh air in the heat exchanger, then further cooling the cool fresh air to dehumidify the cool, fresh air. The cool fresh air is then passed through a second heat exchanger in heat exchange relationship with return air from the building or room to reduce the relative humidity of the cool, fresh dehumidified air. The fresh air having reduced relative humidity is then introduced into the building or room. The return air from the second heat exchanger is passed through the first heat exchanger to temper the incoming fresh air, then discharged to the atmosphere outside of the building or room.

In a preferred embodiment of the one method all of the fresh air provided to the building or room and no recycle air passes through the heat exchangers.

The one method does not require any steps which would significantly change the method. Using the same apparatus to warm air instead of cooling and dehumidifying is a second method and not a change in the one method. For the sake of simplicity, economy and reliability, no additional steps are desired.

The first ventilating dehumidifier having a cooling coil positioned in the air stream between heat exchange passes was sold and installation was completed in August 1990 in a laboratory classroom building at Longwood College as a test to determine if it would remedy a defective air conditioner installation. The ventilating dehumidifier did not have the capability to recover heat from indoor air. The ventilating dehumidifier is described in Hot Line, Volume 1, Number 1, February 1991.

The air conditioner created a humid, stuffy atmosphere in the building and caused moisture to condense on the ceiling and drip down on the lab benches below. Suit was filed against the installers of the air conditioning unit. The operation of the ventilating dehumidifier was monitored by the Engineering firm responsible for the installation during parts of two heating and cooling seasons to determine if a proper humidity and air quality could be maintained. The results of the monitoring were relayed to the inventor. Due to the fact that individuals with scientific backgrounds occupied the building, it was expected that the occupants would notify the installers of the ventilating dehumidifier of any problems with the unit. After it was apparent that the test would be successful, the ventilating dehumidifier was put on public sale. The present patent application includes additional improvements made on the ventilating dehumidifier during the time of the test and following. Also the lawsuit against the installers of the air conditioning system was settled.

Figure 1:
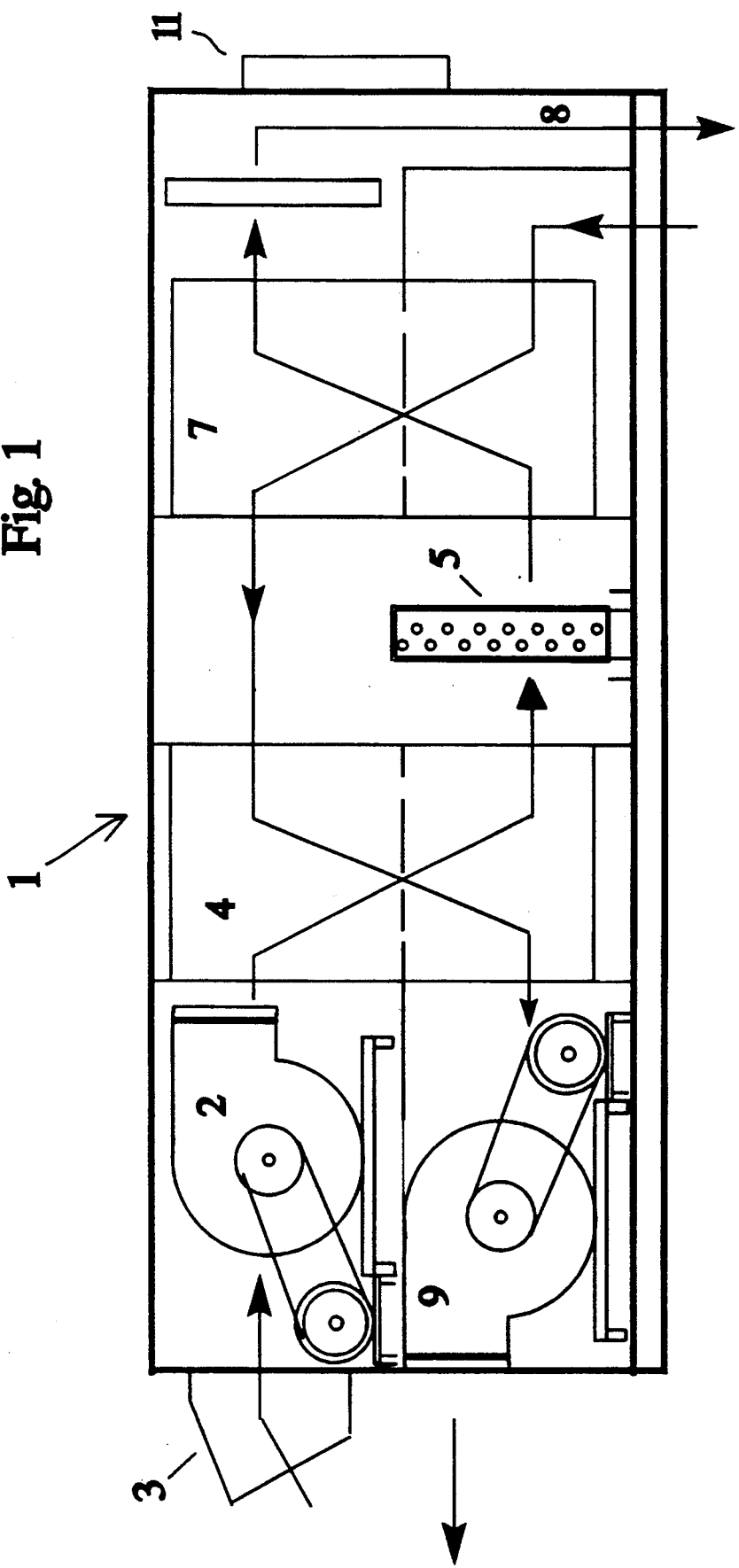
FIG. 1 is a side sectional view of the heat recovery ventilating dehumidifier of the present invention.

The mechanism of the heat recovery ventilating dehumidifier of the present invention is shown in FIG. 1. The arrows indicate the direction of fresh air flow. Fresh outside air enters blower 2 of the heat recovery ventilating dehumidifier 1 through hood with bird screen 3. The fresh air then passes through first heat exchanger 4 where it passes in counter current heat exchange relationship with exhausting stale air. By the heat exchange the fresh air is cooled and dehumidified during warm weather or warmed during cold weather.

The fresh air then passes through refrigerant coil 5 where it is further cooled and dehumidified during warm weather. During cool weather refrigerant coil 5 functions as or is replaced by a heater. The cooled dehumidified fresh air then passes through second heat exchanger 7 in heat exchange relationship with the exhausting stale air from the room or building being ventilated. The temperature of the fresh, cooled, dehumidified air is raised in heat exchanger 7 is with a resultant decrease in relative humidity. The cool, fresh, low relative humidity air then passes through a filter and exits into a building through duct 8 as supply air. The stale air from the building first passes through second heat exchanger 7 where it warms the incoming fresh air stream and is in turn cooled. The cooled stale air then passes through first heat exchanger 4 where it cools warm air during warm weather and warms cool air during cool weather. The stale air is then exhausted to atmosphere by exhaust blower 9. The heat recovery ventilating dehumidifier preferably operates all the time the building is occupied, and preferably does not operate when the building is unoccupied to save energy.

The controls for the heat recovery ventilating dehumidifier are shown at 11. The control system is very simple. When the temperature of the air leaving the heat recovery ventilating dehumidifier, during the cooling season, is above set point, say 70° C., the compressor (not shown) is operating at full speed. When the temperature is below setpoint the compressor operates at low speed.

In the heating mode the compressor is off and refrigerant coil 5 is replaced by a heating coil and controlled by a supply air thermostat.

Figure 2:
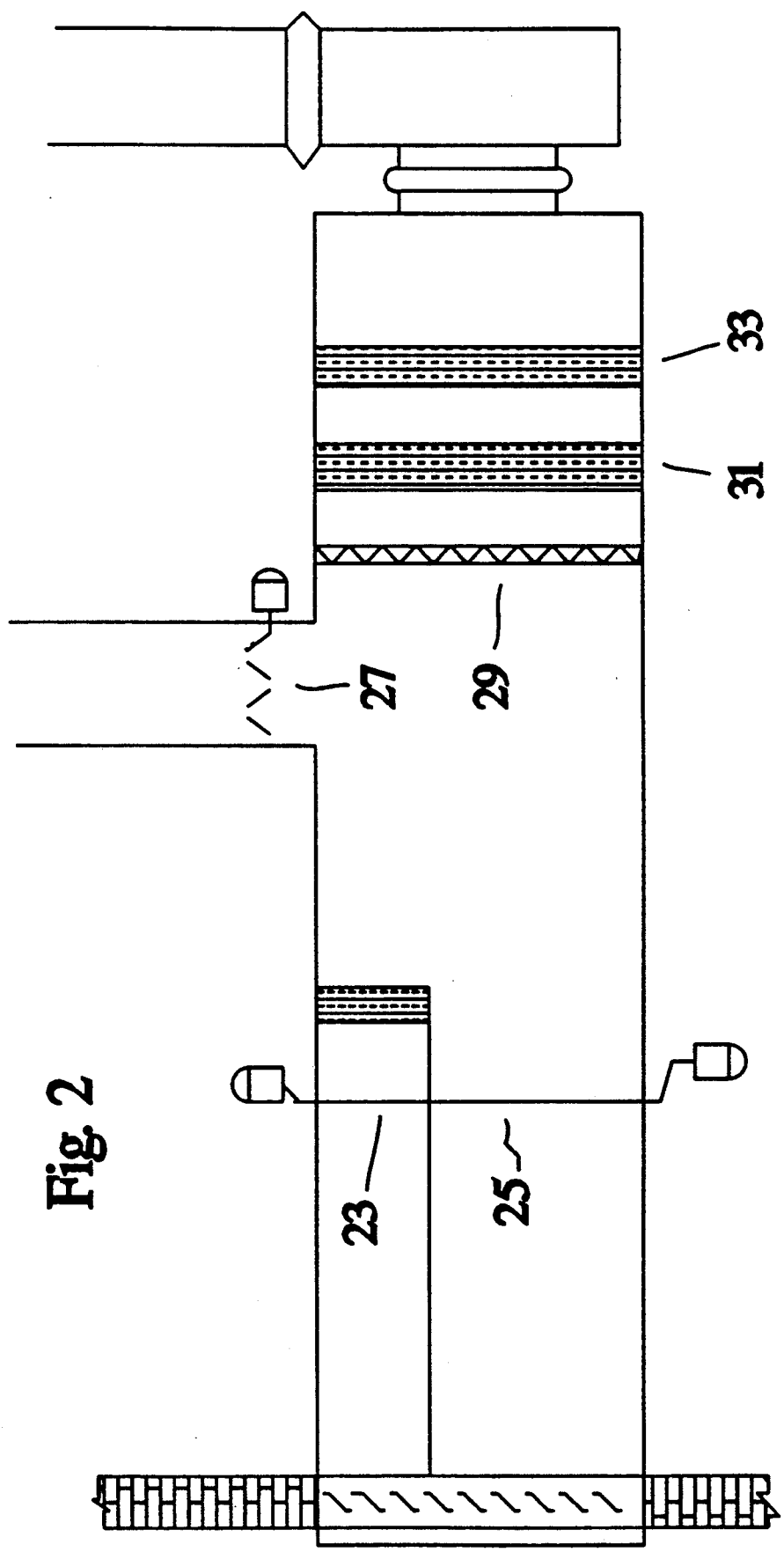
FIG. 2 is a side sectional view of a conventional heating, cooling and air conditioning unit which has its ventilating capacity blocked.

During the cooling season, if the heat recovery ventilating dehumidifier 1 handles only a minor amount of air, compared to the total supply air, then the condenser in the heat recovery ventilating dehumidifier 1 can be controlled by space humidity. When the relative humidity rises above 55% the heat recovery ventilating dehumidifier can be called upon to dehumidify. The heating, cooling and air conditioning unit 21 shown in FIG. 2 can be designed to do the total sensible cooling the remainder of the time. The minimum fresh outside air damper 23 and maximum fresh outside air damper 25 of unit 21 are permanently closed, when unit 21 is used in combination with heat recovery ventilating dehumidifier 1. Return air damper 27 is open allowing air to recirculate through filter 29, cooling coils 31 during hot weather and heater 33 during cold weather.

The heat recovery ventilating dehumidifier 1, as shown in FIG. 1, saves energy in two ways: first, the outdoor air is precooled within the first air-to-air heat exchanger 3, then after the air is cooled further by passage through refrigerant coil 5, it is reheated the passage through the second heat exchanger 7.

Figure 3:
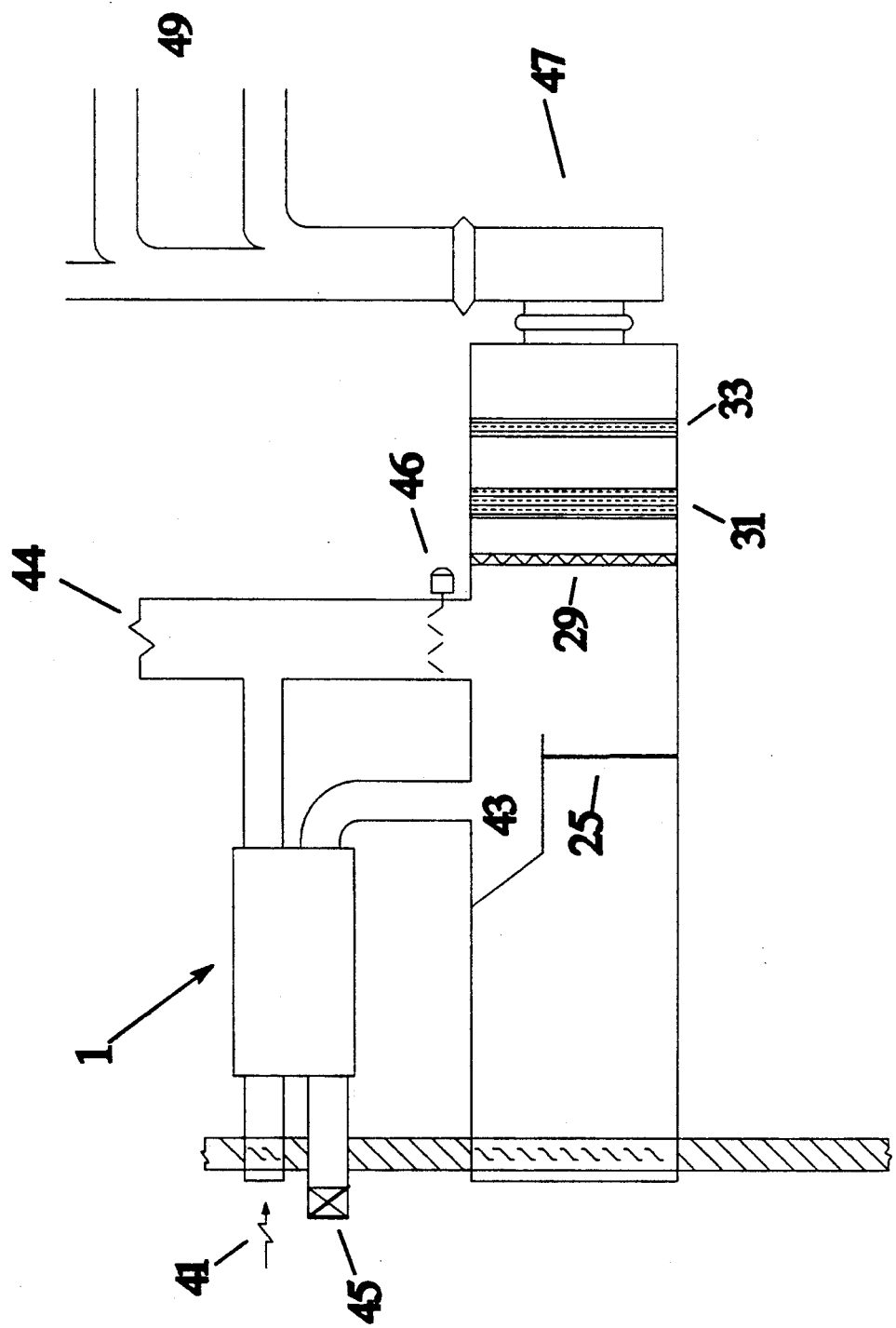
FIG. 3 is a side sectional view the heat recovery ventilating dehumidifier connected in series with an air-conditioning unit.

As an alternative embodiment, the heat recovery ventilating dehumidifier providing fresh, dehumidified, tempered air can be connected in series with the building air-conditioning system as shown in FIG. 3, to provide fresh, dehumidified, tempered air to the air-conditioner. When the air-conditioner is not working the fresh, dehumidified, tempered air can be blown through the air-conditioner into the building.

In the embodiment shown in FIG. 3, fresh out door air enters the heat recovery ventilating dehumidifier 1 at 41 and exits at 43 into the intake of the air conditioning system. Return air passes through return air duct 44 through the heat recovery ventilating dehumidifier 1 and exhausts at exhaust duct 45. During the operation of heat recovery ventilating dehumidifier 1, return air damper 46 is closed. The fresh air having its relative humidity reduced in heat recovery ventilating dehumidifier passes through the air conditioning unit and is blown by supply fan 47 to conditioned space 49.

The heat recovery ventilating dehumidifier 1 will pay for itself immediately when installed with a HVAC unit because of the reduction of mechanical refrigeration equipment, reduced central heating equipment, and most importantly it is now possible to use standard HVAC equipment without modification, except for the closing of the intake air dampers, in combination with the heat recovery ventilating dehumidifier 1. This is not to mention the reduction in operating cost and reduced peak demand charges. In many areas of the country there is a good possibility of a hefty rebate from the power company. The heat recovery ventilating dehumidifier 1 saves energy just when the power company wants it saved, at peak air-conditioning time.

What is claimed is:

1. A heat recovery ventilating dehumidifier for a building or room, the improvement comprising a first heat exchanger to temper incoming fresh air, a duct connected between the first heat exchanger and an outside air inlet located outside the building for the entry of fresh air into the first heat exchanger, means to refrigerate a surface, the refrigerated surface connected to the first heat exchanger by a passageway, to provide a means to cool the tempered fresh air and dehumidify the tempered fresh air from the first heat exchanger during warm or humid weather, a second heat exchanger, a return duct to the second heat exchanger from the building or room, a passageway from the refrigerated surface to the second heat exchanger, the second heat exchanger providing a means to temper the fresh dehumidified air by heat exchange with return air supplied to the second heat exchanger from a return air duct to the second heat exchanger from the building or room, a fresh air duct from the second heat exchanger to the interior of the building or room to allow the tempered dehumidified fresh air to enter the building or room, a return passage from the second heat exchanger to the first heat exchanger without thermal conditioning means therein for return air, a passage through the first heat exchanger for the return air to pass in heat exchange relationship with the entering fresh air to temper the entering fresh air, and an exhaust duct from the first heat exchanger to an outlet located outside of the building to discharge the return air to the atmosphere outside of the room or building.

2. The apparatus of claim 1 wherein the first heat exchanger is an air to air heat exchanger.

3. The apparatus of claim 1 wherein the building or room is a building occupied by people at least part of the time.

4. The apparatus of claim 1 wherein the improvement is further characterized by an air-conditioning system in addition to the apparatus of claim 1, and further characterized by the absence of a functional fresh air inlet duct in the air-conditioning system used in conjunction with the apparatus of claim 1.

5. A heat recovery ventilating dehumidifier for a building or room, the improvement consisting essentially of a first heat exchanger to temper incoming fresh air, a duct connected between the first heat exchanger and an outside air inlet located outside the building for the entry of fresh air into the first heat exchanger means to refrigerate a surface, the refrigerated surface, connected to the first heat exchanger by a passageway, to provide a means to cool the tempered fresh air and dehumidify the tempered fresh air from the first heat exchanger during warm or humid weather, a second heat exchanger, a passageway from the refrigerated surface to the second exchanger, the second heat exchanger providing a means to temper the fresh dehumidified air by heat exchange with return air supplied to the second heat exchanger from a return duct to the second heat exchanger from the building or room, a fresh air duct from the second heat exchanger into the building or room to allow the tempered dehumidified fresh air to enter the building or room, a return passage from the second heat exchanger to the first heat exchanger without thermal conditioning means therein for return air, a return passage through the first heat exchanger for the return air to pass in heat exchange relationship with the entering fresh air to temper the entering fresh air, and an exhaust duct from the first heat exchanger to an outside outlet located outside of the building to discharge the return air to the atmosphere outside of the room or building.

6. The apparatus of claim 5 wherein the first heat exchanger is an air to air heat exchanger.

7. The apparatus of claim 5 wherein the building or room is a building occupied by people at least part of the time.

8. The apparatus of claim 5 wherein the improvement is further characterized by an air-conditioning system in addition to the apparatus of claim 5, and further characterized by the absence of a functional fresh air inlet duct in the air-conditioning system used in conjunction with the apparatus of claim 5.

9. A heat recovery ventilating dehumidifier for a building or room, the improvement consisting of a first heat exchanger to temper incoming fresh air, a duct connected between the first heat exchanger and an outside air inlet located outside of the building for the entry of fresh air into the first heat exchanger means to refrigerate a surface, the refrigerated surface connected to the first heat exchanger by a passageway, to provide means to cool the tempered fresh air and dehumidify the fresh air during warm or humid weather, a second heat exchanger, a passageway from the refrigerated surface to the second heat exchanger, the second heat exchanger providing a means to temper the fresh dehumidified air by heat exchange with return air supplied to the second heat exchanger from a return air duct to the second heat exchanger from the building or room, a fresh air duct from the second heat exchanger to the interior of the building or room to allow passage of the tempered dehumidified fresh air into the building or room, a return passage from the second heat exchanger to the first heat exchanger without thermal conditioning means therein for return air, a passage through the first heat exchanger for the return air to pass in heat exchange relationship with the entering fresh air to temper the entering fresh air, and an exhaust duct from the first heat exchanger to an outlet located outside of the building to discharge the turn air to the atmosphere outside of the room or building.

10. The apparatus of claim 9 wherein the first heat exchanger is an air to air heat exchanger.

11. The apparatus of claim 10 wherein the building or room is a building occupied by people at least part of the time.

12. The apparatus of claim 9 wherein the improvement is further characterized by an air-conditioning system in addition to the apparatus of claim 9, and further characterized by the absence of a functional fresh air inlet duct in the air-conditioning system used in conjunction with the apparatus of claim 9.

13. A heat recovery ventilating dehumidifier for a building or room, the building or room having an air conditioning system, the air conditioning system having no functional fresh air duct, the improvement comprising a first heat exchanger to temper incoming fresh air, a duct connected between the first heat exchanger and an outside air inlet located outside the building for the entry of fresh air into the first heat exchanger, means to refrigerate a surface, the refrigerated surface connected to the first heat exchanger by a passageway, to provide a means to cool the tempered fresh air and dehumidify the tempered fresh air from the first heat exchanger during warm or humid weather, a second heat exchanger, a passageway from the refrigerated surface to the second heat exchanger, the second heat exchanger providing a means to temper the fresh dehumidified air by heat exchange with return air supplied to the second heat exchanger from a return air duct to the second heat exchanger from the building or room, a fresh air duct from the second heat exchanger to the interior of the building or room to allow the tempered dehumidified fresh air to enter the building or room, a return passage from the second heat exchanger to the first heat exchanger without thermal conditioning means, therein for return air, a passage through the first heat exchanger for the return air to pass in heat exchange relationship with the entering fresh air to temper the entering fresh air, and an exhaust duct from the first heat exchanger to an outlet located outside of the building to discharge the return air to the atmosphere outside of the room or building.

14. A method of providing fresh, cool, dehumidified air to an air conditioned building or room comprising drawing fresh air into a first heat exchanger through a duct connected between the first heat exchanger and an air inlet located outside of the building, cooling the fresh air in the heat exchanger by heat exchange with a return air stream, then further cooling the cool fresh air by a refrigeration source to dehumidify the cool, fresh air, then passing the cool, fresh, dehumidified air through a second heat exchanger in heat exchange relationship with return air from the building or room to reduce the relative humidity of the cool, fresh dehumidified air, then introducing the fresh air having reduced relative humidity into the building or room, drawing return air through a return duct to the second heat exchanger from the building or room, thus warming the fresh air and cooling the return air, passing the return air from the second heat exchanger to the first heat exchanger without thermal conditioning thereof and then through the first heat exchanger to rewarm the return air and to cool the incoming fresh air, then discharging the return air through a duct from the first heat exchanger to the atmosphere outside of the building or room.

15. The method of claim 14 wherein all of the fresh air provided to the building or room passes through the heat exchangers and no recycle air passes through the heat exchangers.

16. A method of providing fresh, cool, dehumidified air to an air conditioned building or room consisting essentially of drawing fresh air into a first heat exchanger through a duct connected between the first heat exchanger and an air inlet located outside of the building, cooling the fresh air in the heat exchanger by heat exchange with a return air stream, then further cooling the cool fresh air by a refrigeration source to dehumidify the cool, fresh air, then passing the cool, fresh dehumidified air through a second heat exchanger in heat exchange relationship with return air from the building or room to reduce the relative humidity of the cool, fresh dehumidified air, then introducing the fresh air having reduced relative humidity into the building or room, drawing return air through a return duct to the second heat exchanger from the building or room, thus warming the fresh air and cooling the return air, passing the return air from the second heat exchanger to the first heat exchanger without thermal conditioning thereof and then through the first heat exchanger to rewarm the return air and to cool the incoming fresh air, then discharging the return air through a duct from the first heat exchanger to the atmosphere outside of the building or room.

17. A method of providing fresh, cool, dehumidified air to an air conditioned building or room consisting of drawing fresh air into a first heat exchanger through a duct connected between the first heat exchanger and an air inlet located outside of the building, cooling the fresh air in the heat exchanger by heat exchange with a return air stream, then further cooling the cool fresh air by a refrigeration source to dehumidify the cool, fresh air, then passing the cool, fresh, dehumidified air through a second heat exchanger in heat exchange relationship with return air from the building or room to reduce the relative humidity of the cool, fresh dehumidified air, then introducing the fresh air having reduced relative humidity into the building or room, drawing return air through a return duct to the second heat exchanger from the building or room, thus warming the fresh air and cooling the return air, passing the return air from the second heat exchanger to the first heat exchanger to the first heat exchanger without thermal conditioning thereof and then through the first heat exchanger to rewarm the return air and to cool the incoming fresh air, then discharging the return air through a duct from the first heat exchanger to the atmosphere outside of the building or room.

18. A heat recovery ventilating dehumidifier for an air conditioned building or air conditioned room, the improvement comprising a first heat exchanger to temper incoming fresh air, a duct connected between the first heat exchanger and an outside air inlet located outside the building for the entry of fresh air into the first heat exchanger, means to refrigerate a surface, the refrigerated surface connected to the first heat exchanger by a passageway, to provide a means to cool the tempered fresh air and dehumidify the tempered fresh air from the first heat exchanger during warm or humid weather, a second heat exchanger, a passageway from the refrigerated surface to the second heat exchanger, a return duct to the second heat exchanger from the building or room, the second heat exchanger providing a means to temper the dehumidified fresh air by heat exchange with return air from the building or room, a fresh air duct from the second heat exchanger to an intake duct of an air conditioner which conditions the air going to the interior of the building or room to allow the tempered fresh air to enter the building or room through the air conditioner, a return passage from the second heat exchanger to the first heat exchanger without thermal conditioning means therein for return air, a passage through the first heat exchanger for the return air to pass in heat exchange relationship with the entering fresh air to temper the entering fresh air, and an exhaust duct from the first heat exchanger to an outlet located outside of the building to discharge the return air to the atmosphere outside of the room or building.

19. The heat recovery ventilating dehumidifier of claim 18 wherein the air conditioner has no operable fresh air intake vent other than the duct from the second heat exchanger.

* * * * *